US012321998B2

(12) United States Patent
Doutre et al.

(10) Patent No.: US 12,321,998 B2
(45) Date of Patent: Jun. 3, 2025

(54) AUTOMATED DETECTION OF AND RESPONSE TO PROBABLE UNLAWFUL ACTIVITY AT COMMERCIAL OR RESIDENTIAL PROPERTY

(71) Applicant: MOTOROLA SOLUTIONS, INC., Chicago, IL (US)

(72) Inventors: Barbara R. Doutre, Plantation, FL (US); Patrick D. Koskan, Jupiter, FL (US); Jake Renko, Coral Springs, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 253 days.

(21) Appl. No.: 18/147,625

(22) Filed: Dec. 28, 2022

(65) Prior Publication Data

US 2024/0221101 A1 Jul. 4, 2024

(51) Int. Cl.
*G06Q 10/10* (2023.01)
*B64C 39/02* (2023.01)
(Continued)

(52) U.S. Cl.
CPC ......... *G06Q 50/265* (2013.01); *B64C 39/024* (2013.01); *G06Q 50/16* (2013.01);
(Continued)

(58) Field of Classification Search
CPC .... G06Q 50/265; G06Q 50/16; B64C 39/024; G06V 10/62; G06V 20/17; G06V 20/176; G06V 20/52; G06V 40/20; B64U 2101/31
(Continued)

(56) References Cited

U.S. PATENT DOCUMENTS 7,571,146 B2 * 8/2009 Dalton ................... G06T 17/05
706/45
8,620,093 B2 12/2013 Nguyen et al.
(Continued)

FOREIGN PATENT DOCUMENTS

DE 102009018073 A1 1/2010
KR 20200017601 A 2/2020
(Continued)

OTHER PUBLICATIONS

Alcantarilla, et al., "Street-View Change Detection with Deconvolutional Networks," Spanish MEC Project, <http://www.robesafe.com/personal/roberto.arroyo/docs/Alcantarilla16rss.pdf> 2014 (10 pages).
(Continued)

*Primary Examiner* — Jonathan P Ouellette
(74) *Attorney, Agent, or Firm* — Michael Best & Friedrich LLP

(57) ABSTRACT

Methods and systems for detecting changes in real estate properties for a public safety purpose. An example method includes receiving images of a residential or commercial property and comparing pairs of received images corresponding to different dates to detect structural changes to the property. The method further includes accessing a property permit database to identify unpermitted structural changes and triggering an anomaly check directed at detecting: a first anomaly associated with the type of unpermitted change; a second anomaly associated with an individual residing on the property; and a third anomaly associated with the property based on a public-safety record. The method further includes, in response to at least one of the first, second, and third anomalies having been detected, performing at least one specific automated responsive action through the corresponding system.

22 Claims, 4 Drawing Sheets

(51) Int. Cl.

| | |
|---|---|
| *G06F 21/31* | (2013.01) |
| *G06Q 40/08* | (2012.01) |
| *G06Q 50/16* | (2012.01) |
| *G06Q 50/26* | (2012.01) |
| *G06V 10/62* | (2022.01) |
| *G06V 20/10* | (2022.01) |
| *G06V 20/17* | (2022.01) |
| *G06V 20/52* | (2022.01) |
| *G06V 40/20* | (2022.01) |
| *B64U 101/31* | (2023.01) |

(52) U.S. Cl.
CPC .............. *G06V 10/62* (2022.01); *G06V 20/17* (2022.01); *G06V 20/176* (2022.01); *G06V 20/52* (2022.01); *G06V 40/20* (2022.01); *B64U 2101/31* (2023.01)

(58) Field of Classification Search
USPC .......................... 705/1.1–912, 313, 314, 325
See application file for complete search history.

(56) References Cited

U.S. PATENT DOCUMENTS

| | | | |
|---|---|---|---|
| 9,514,386 | B2 | 12/2016 | Scott et al. |
| 11,238,282 | B2* | 2/2022 | Ng .......................... G06N 3/088 |
| 11,240,367 | B1* | 2/2022 | Parker-Bello ..... H04M 1/72421 |
| 11,676,258 | B1* | 6/2023 | Harvey ................... G06F 18/24 382/141 |
| 11,900,490 | B1* | 2/2024 | Yadav ........................ G06T 7/60 |
| 2016/0286156 | A1* | 9/2016 | Kovac .................... G06Q 50/26 |
| 2016/0337441 | A1* | 11/2016 | Bloomquist ........... G06Q 10/06 |
| 2017/0053538 | A1 | 2/2017 | Samarasekera et al. |
| 2017/0323540 | A1* | 11/2017 | Boykin .................... H04N 1/00 |
| 2018/0050800 | A1* | 2/2018 | Boykin .............. H04N 21/2368 |
| 2018/0314861 | A1* | 11/2018 | Guzik .................... G06F 16/381 |
| 2019/0271550 | A1 | 9/2019 | Breed et al. |
| 2019/0295258 | A1* | 9/2019 | Longobardi .............. G06T 7/11 |
| 2021/0019645 | A1* | 1/2021 | Petrey, Jr. .............. G06V 40/16 |
| 2021/0073929 | A1* | 3/2021 | Rose ........................ G06F 16/29 |
| 2021/0084451 | A1* | 3/2021 | Williams ................ H04W 4/38 |
| 2023/0005257 | A1* | 1/2023 | Wang ...................... G06T 7/001 |
| 2023/0360519 | A1* | 11/2023 | Sudhir ............... G01C 21/3697 |
| 2024/0362810 | A1* | 10/2024 | Portail ................. G06V 10/764 |

FOREIGN PATENT DOCUMENTS

| | | |
|---|---|---|
| KR | 20210131119 A | 11/2021 |
| WO | 2021003824 A1 | 1/2021 |

OTHER PUBLICATIONS

Arandjelovic, et al., "NetVLAD: CNN architecture for weakly supervised place recognition," Willow project, <https://arxiv.org/pdf/1511.07247.pdf> (17 pages).

Google Support, "Edit incorrect Street View imagery for your business," webpage accessed Dec. 21, 2022 <https://support.google.com/business/answer/160464?hl=en> (1 page).

Humphries, "No Need for a Car: Add Images to Google Street View Using Your Phone," <https://www.pcmag.com/news/no-need-for-a-car-add-images-to-google-street-view-using-your-phone> published Dec. 3, 2020 (7 pages).

Lina, et al., "Research of illegal building monitoring system construction with 3S integration technology," The 2nd International Conference on Information Science and Engineering, <doi: 10.1109/ICISE.2010.5691383.> 2010 (pp. 3908-3911).

Perez, "Google now lets anyone contribute to Street View using AR and an app," <https://techcrunch.com/2020/12/03/google-now-lets-anyone-contribute-to-street-view-using-ar-and-an-app/> published Dec. 3, 2020 (13 pages).

Warburg, et al., "Mapillary Street-Level Sequences: A Dataset for Lifelong Place Recognition," 2020 IEEE/CVF Conference on Computer Vision and Pattern Recognition (CVPR), <DOI 10.1109/CVPR42600.2020.00270> 2020 (10 pages).

* cited by examiner

AUTOMATED DETECTION OF AND RESPONSE TO PROBABLE UNLAWFUL ACTIVITY AT COMMERCIAL OR RESIDENTIAL PROPERTY

BACKGROUND OF THE INVENTION

Geospatial data analyses are based on collecting, processing, combining, and visualizing various types of geospatial data. The results of such analyses can be used to model and represent how people, objects, and phenomena interact within space and time, as well as to make predictions based on trends in the data. Common classes of geospatial data include Points of Interest, Property, Mobility, Demographics, Boundaries, Environment, Streets, and Imagery.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments, examples, features, and aspects of concepts that include the claimed subject matter and explain various principles and advantages of those embodiments, examples, features, and aspects.

Figure 1:
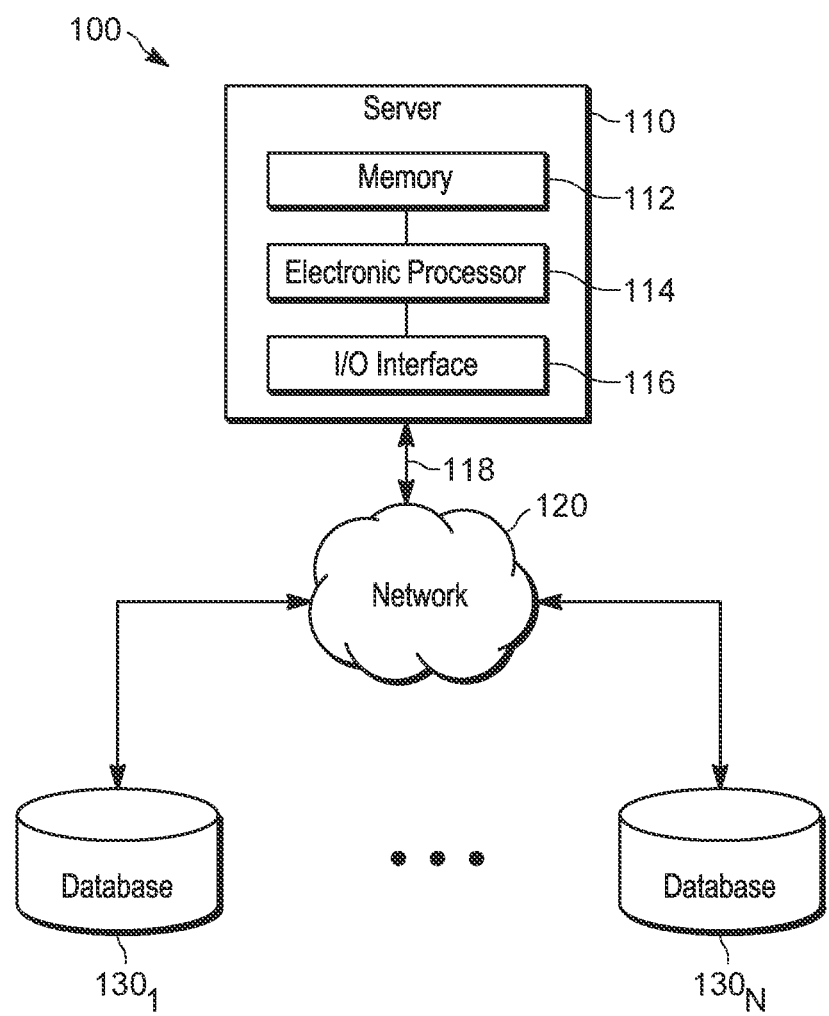
FIG. 1 is a block diagram illustrating an automated detection and response system according to examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various aspects, features, examples, and embodiments.

The apparatus and method components have been represented where appropriate by conventional symbols in the drawings, showing only those specific details that are pertinent to understanding the aspects, features, examples, and embodiments so as not to obscure the disclosure with details that will be readily apparent to those of ordinary skill in the art having the benefit of the description herein.

DETAILED DESCRIPTION OF THE INVENTION

Geospatial data analytics typically puts the relevant data in a more accessible format, e.g., by providing representations that are more conducive to picking up various patterns, such as correlations, hidden functionalities, changes over time, and other not readily apparent relationships.

Human trafficking typically involves the use of force, fraud, or coercion to obtain some type of labor or commercial sex act. According to the available statistics, every year, millions of men, women, and children are trafficked worldwide, including developed countries. In many cases, signs of human trafficking are missed by observers.

The inventors have discovered, among other things, a way to utilize geospatial data analyses with respect to conditions that may indicate the presence of human trafficking. Some benefits of the techniques created include improved discoverability of trends and patterns, better-informed decision making, and more precisely targeted responses or policies to instances of human trafficking.

Geospatial data analyzed in systems and techniques described herein include manifestations on real estate (for example, residential and commercial buildings and property). These manifestations may relate to changes in certain structures and/or working conditions in places where human trafficking is perpetrated. For example, exterior manifestations include new (not previously existing) tents, outbuildings, port-a-potties, or other structures found on a residential or commercial property. Interior manifestations include false walls, locked doors, high people count, and other features that seem out of place in a home or business.

One example described herein addresses the problem of detecting and responding to instances of human trafficking by providing an automated system that leverages elements of geospatial-data analytics to obtain leads and then triggers additional checks and/or automated responsive actions with respect to properties identified in the leads. The system pulls together and uses information accessible through various databases, applies qualitative and quantitative criteria to assess the information, and in some cases triggers a wellness check at the identified property. The wellness check typically generates additional (complementary) information. Based on the combined information, probable instances of human trafficking can be discovered with high reliability and referred to law enforcement for further action.

One example described herein provides a system for detecting changes in properties, comprising an electronic processor and memory including program code. The electronic processor is configured, through execution of the program code, to receive, through an interface connected to the electronic processor, a plurality of images of properties including a first image of a property corresponding to a first date and a second image of the property corresponding to a later second date, wherein the property is at least one of a residential property and a commercial property. The electronic processor is further configured to compare the first image and the second image to detect a structural change to the property and access, through the interface, a property permit database to identify an unpermitted change in the structural change. The electronic processor is further configured to trigger an anomaly check directed at detecting: a first anomaly associated with a structure type of the unpermitted change; a second anomaly associated with an individual residing on the property; and a third anomaly associated with the property based on a public-safety record. The electronic processor is configured to, in response to at least one of the first, second, and third anomalies having been detected, perform at least one automated responsive action selected from the group consisting of updating a record in a database to flag the property as a potential site of unlawful activity, triggering a wellness check at the property, and generating a recommendation for a public-safety officer.

Another example provides an automated method of detecting changes in properties. The method includes receiving, through an interface connected to an electronic processor, a plurality of images of properties including a first image of a property corresponding to a first date and a second image of the property corresponding to a later second date, wherein the property is at least one of a residential property and a commercial property. The method also includes comparing, with the electronic processor, the first image and the second image to detect a structural change to the property and accessing, with the electronic processor and through the interface, a property permit database to identify an unpermitted change in the structural change. The method further includes triggering, with the electronic processor, an anomaly check directed at detecting: a first anomaly associated with a structure type of the unpermitted change; a second anomaly associated with an individual residing on the property; and a third anomaly associated with the property based on a public-safety record. The method further includes, in response to at least one of the first, second, and third anomalies having been detected, performing, with the electronic processor, at least one automated responsive action selected from the group consisting of updating a record in a database to flag the property as a potential site of unlawful activity, triggering a wellness check at the property, and generating a recommendation for a public-safety officer.

Yet another example provides a non-transitory computer-readable medium storing instructions, that when executed by an electronic processor, perform a set of functions. The set of functions includes: (i) receiving, through an interface connected to an electronic processor, a plurality of images of properties including a first image of a property corresponding to a first date and a second image of the property corresponding to a later second date, wherein the property is at least one of a residential property and a commercial property; (ii) comparing, with the electronic processor, the first image and the second image to detect a structural change to the property; (iii) accessing, with the electronic processor and through the interface, a property permit database to identify an unpermitted change in the structural change; triggering, with the electronic processor, an anomaly check directed at detecting: a first anomaly associated with a structure type of the unpermitted change; a second anomaly associated with an individual residing on the property; and a third anomaly associated with the property based on a public-safety record; and (iv) in response to at least one of the first, second, and third anomalies having been detected, performing, with the electronic processor, at least one automated responsive action selected from the group consisting of updating a record in a database to flag the property as a potential site of unlawful activity, triggering a wellness check at the property, and generating a recommendation for a public-safety officer.

FIG. 1 is a block diagram of an automated detection and response system 100 according to some examples. In the example shown, the system 100 includes a networked computing device (for example, a server) 110 connected to a network 120 via a communication link 118. In various examples, the network 110 includes a plurality of computing and communication devices, such as computers, terminals, network nodes, servers, cloud-based computing devices, routers, relays, access points, switches, and additional communication links. In operation, the network 100 provides for bidirectional communications between the server 110 and a plurality of databases $130_1$-$130_N$, where N is a positive integer greater than one. In various examples, the databases $130_1$-$130_N$ include one or more public-safety (PS) databases and one or more open or publicly accessible databases. The PS databases include but are not limited to PS logs, criminal records of individuals, court decisions (including civil injunctions), image and video depositories (including plane, drone, dashcam, body worn camera image/video files), and fire-department blueprints and inspections. The open or publicly accessible databases include but are not limited to real estate databases, insurance company databases, power company databases, social media portals, and local government (e.g., county) property and tax-appraisal records.

In the example shown, the server 110 includes a memory 112, an electronic processor 114 (for example, a microprocessor, a central processing unit, or another electronic processing circuit), and an input/output (I/O) interface 116. The I/O interface 116 includes suitable circuits and other components that enable the server 110 to receive various inputs from external devices and data sources and to transmit various outputs to external devices and data sinks. In particular, the I/O interface 116 enables communicative connection of the server 110 to the network 120 via the communication link 118. In some examples, the I/O interface 116 is also used to connect the server 110 to a display or other local human interface device.

In some examples, the memory 112 includes nonvolatile memory (NVM) and buffers to store data and program code. The memory 112 operates to share the data with the electronic processor 114, e.g., for applying thereto various operations of at least some methods described herein. The memory 112 further operates to provide program code, which when executed by the electronic processor 114 enables the server 110 to perform various operations and functions in accordance with the program code. In some examples, the program code implements computer models, data filtering and analytics functions, generation of control messages or commands, and other computing operations associated with various automated methods described below.

Figure 2:
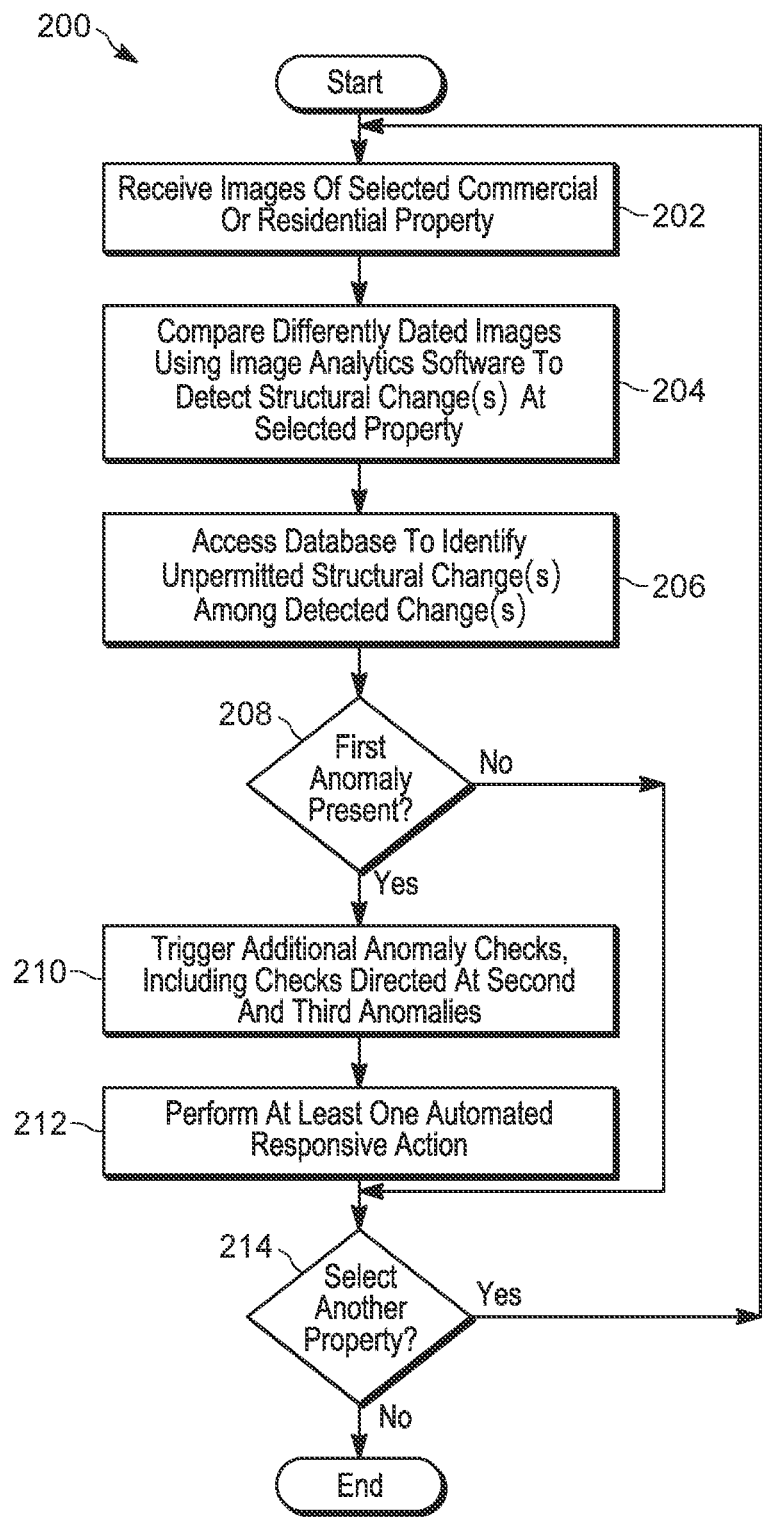
FIG. 2 is a flowchart illustrating a method of processing information in the automated detection and response system of FIG. 1 according to some examples.

FIG. 2 is a flowchart illustrating a method 200 of processing information in the automated detection and response system 100 according to some examples. The method 200 is described with continued reference to FIG. 1. Some examples of the operations performed in accordance with the method 200 are additionally illustrated and described in reference to FIGS. 3-4.

The method 200 includes the electronic processor 114 receiving, through the I/O interface 116, a plurality of images of a selected commercial or residential property (in block 202). In various examples, the property is selected randomly, during a periodic scan of properties, or in response to a pointer thereto, such as a call from a neighbor or an anonymous tip. In one example, the images are retrieved by the server 110 from one or more databases $130_n$, where n=1, . . . , N. The retrieved images typically include at least a first image of the selected property corresponding to a first date and a second image of the selected property corresponding to a later second date. In some cases, multiple images of the selected property corresponding to multiple dates are retrieved (if available).

Retrieved images can be sourced and provided from varying types of cameras including but not limited to traditional visible light cameras, infrared cameras, millimeter wave RADAR (Radio Detection and Ranging) cameras, LIDAR (laser imaging, detection, and ranging) cameras, thermal cameras, and other imaging technologies.

Once the images are obtained, the electronic processor 114 compares one or more pairs of images of the selected property corresponding to different respective dates (in block 204). The comparison of a pair of images (e.g., of the above-mentioned first and second images) is performed using suitable image analytics software to detect a structural change to the selected property. Example structural changes of interest to this particular application of the image analytics software in the block 204 include, but are not limited to, a new structure that prevents egress from at least one part of the property, a new structure that obscures visibility of at least one part of the property to an outside observer; a new structure for excretion and/or ablution therein (such as an outhouse or an outdoor shower), a new structure suitable for a live-in condition therein, a combination of an external livable structure and a structure that prevents egress therefrom, and a new structure suitable for a work-in condition therein.

The method 200 also includes the electronic processor 114 accessing, through the I/O interface 116 and via the network 120, a local government database $130_n$ containing construction permits and other applicable property permits (in block 206). The electronic processor 114 then operates, in the block 206, to match the structural change(s) to the property identified in the block 204 with the permit(s) associated with the property in the local government database $130_n$. When a particular structural change cannot be matched to a corresponding permit (e.g., such a permit is not present in the database or does not exist), the electronic processor 114 further operates to identify that structural change as an unpermitted change (in the block 206).

The electronic processor 114 then determines (in a decision block 208) whether the structural change(s) to the property identified in the block 204 represent a sufficiently pronounced first anomaly. In one example the first anomaly determination is made in the decision block 208 by computing a sum of fixed weights assigned to different structural changes and/or portions thereof. When the sum exceeds a fixed threshold ("Yes" at the decision block 208), the processing of the method 200 is directed to a block 210. Otherwise ("No" at the decision block 208), the processing of the method 200 is directed to a decision block 214.

In one example, the fixed weights assigned (in the decision block 208) to different unpermitted changes include values selected from the group of values including: a first weight assigned to a structure that prevents egress; a second weight assigned to a structure that obscures visibility; a third weight assigned to a structure for at least one of excretion and ablution therein; a fourth weight assigned to a structure for a live-in condition therein; and a fifth weight assigned to a structure for a work-in condition therein. The fixed weight assigned (in the decision block 208) to different permitted changes is typically zero. However, when a permitted change is deemed (by the image analytics of the block 204) to be a part of a combination of changes, including at least one unpermitted change, the permitted change is given a non-zero weight. For example, when an external livable structure is permitted but is later augmented with an unpermitted structure that prevents egress therefrom, both the external livable structure and the structure that prevents egress therefrom are given non-zero weights in the decision block 208.

The method 200 also includes the electronic processor 114 triggering additional anomaly checks (in the block 210). In one example, such additional anomaly checks include anomaly checks directed at detecting: (i) a second anomaly associated with an individual residing on the property and (ii) a third anomaly associated with the property based on a public-safety record.

The server 110 performs the second anomaly check by accessing one or more of the PS database(s) $130_n$ for information regarding the individual residing on the property. The second anomaly is deemed to be present when such information includes at least one of a criminal record and a civil injunction. In various examples, the criminal record includes an indication of a convicted felon, an indication of a sex offender, and/or an indication of a parole-officer visit. The civil injunction includes an indication of a threat of or an episode of domestic violence, sexual violence, dating violence, and/or repeat violence. In some examples, different indications of the second anomaly are weighted and summed up to generate an anomaly score for the second anomaly.

The server 110 performs the third anomaly check by accessing one or more of the PS database(s) $130_n$ to look for police complaint logs associated with the property address. In a representative example, the third anomaly is deemed to be present when the police complaint logs reflect a large number of people coming and going, presence of an unrecognized child or unrecognized children at the property, and presence of an unrecognized, non-resident person or persons at the property. In some examples, different indications of the third anomaly are weighted and summed up to generate an anomaly score for the third anomaly.

The method 200 also includes the electronic processor 114 performing at least one automated responsive action (in block 212). In one example the type of the responsive action is selected based on the cumulative anomaly score, which is computed by summing up the anomaly scores corresponding to the first, second, and third anomalies. Representative examples of automated responsive action performed in the block 212 include, but are not limited to, updating a record in a database to flag the selected property as a potential site of unlawful activity, triggering a wellness check at the selected property, and generating a recommendation for a public-safety officer. In some examples, when the cumulative anomaly score is relatively high, e.g., exceeds a preselected threshold, the automated responsive action includes a request for an expedited public-safety action at the property.

In some examples, the wellness check at the selected property includes an automated dispatch of a drone for performing an aerial inspection of the property. The aerial inspection may be directed at refining images associated with the unpermitted structural change(s) and/or acquiring images of predetermined elements associated with unlawful living conditions or unlawful working conditions at the property.

In some examples, the wellness check at the selected property includes an automated dispatch to the property of a public-safety officer having a body worn camera (BWC). In various examples, the automated dispatch of a public-safety officer follows the automated dispatch of a drone or is implemented as an independent measure not conditioned on the drone dispatch. During the officer's visit to the property, the BWC operates to capture a video recording. In some examples, the video recording is subjected to video analytics directed at detecting one or more behavioral factors associated with human trafficking. In various cases of human trafficking, such behavioral factors of at least one individual at the property typically include one or more of the following: wearing drab clothing; exhibiting subdued behavior; avoiding eye contact with the visiting officer; manifestations of a language barrier; a body language consistent with human trafficking; appearance of pale complexion; and speaking with rehearsed phrases or in a robot-like manner.

When one or more of the above-indicated behavioral factors are sensed by the visiting officer or by the video analytics, a more focused inspection of the property is initiated, with the more-focused inspection being directed at obtaining some form of tangible evidence of human trafficking, preferably a form of evidence that can be used in court. The more-focused inspection is guided by system-generated prompts. In some examples, a first set of such prompts is directed at guiding the visiting officer to perform a more-targeted inspection of the buildings and/or other structures on the property. For example, based on the image analytics of the block 204 and/or the preceding drone flyby, the first set of prompts may direct the visiting officer to look for egress-preventing bars on windows and doors, exterior shacks or sheds, unusual or suspicious tools or medical equipment, rooms configured or equipped for sleeping many people, etc. In some examples, a second set of the above-mentioned prompts provides the visiting officer with a sequence of computer-generated queries or questions directed at expanding the information pertaining to the first, second, and third anomalies. At least some of the queries are based on elements associated with a probable crime of human trafficking.

The method 200 also includes the electronic processor 114 determining (in a decision block 214) whether to select another property for the above-described automated processing. When another property is going to be selected ("Yes" at the decision block 214), the processing of the method 200 is directed back to the block 202. Otherwise ("No" at the decision block 214), the processing of the method 200 is terminated.

Figure 3:
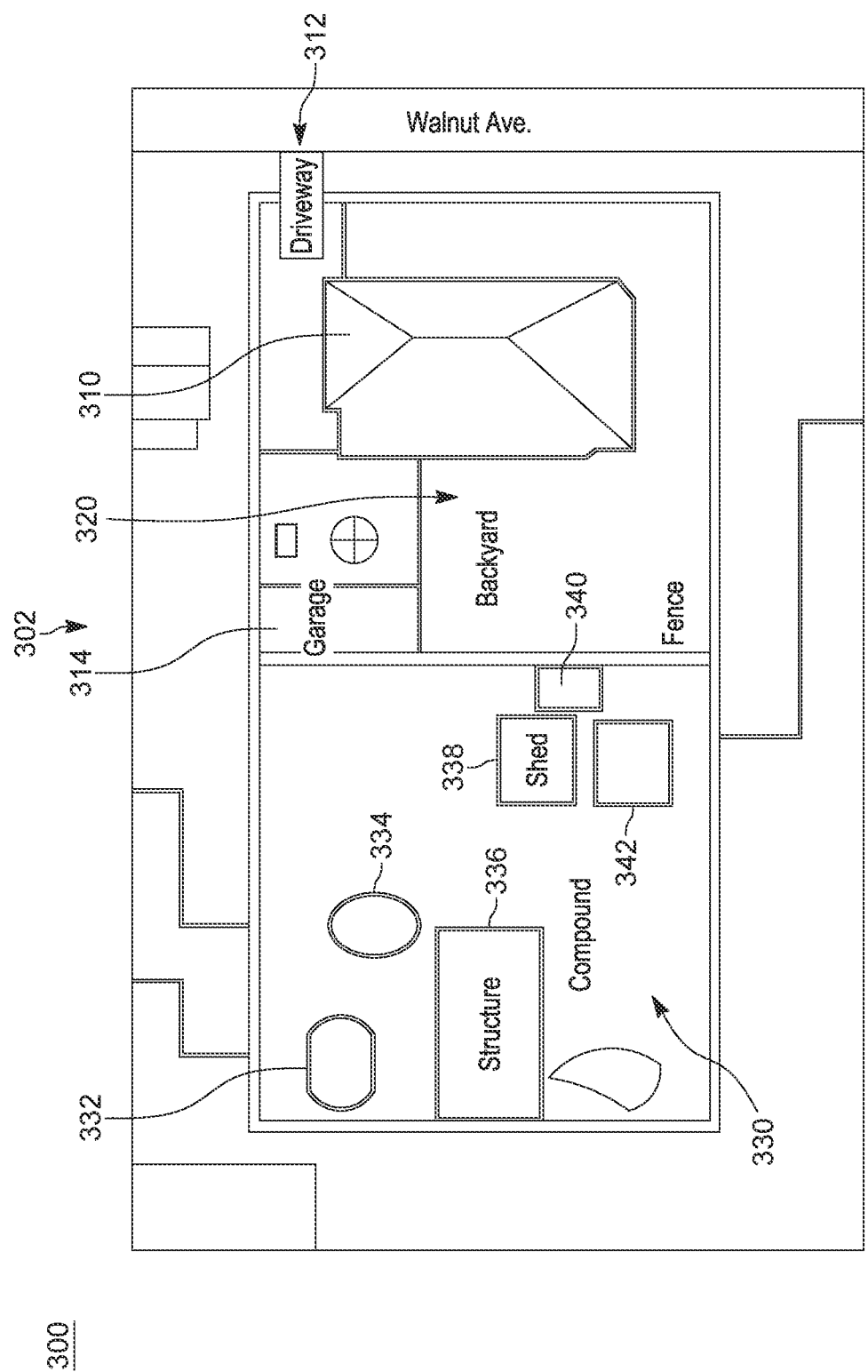
FIG. 3 pictorially illustrates certain operations of the method of FIG. 2 according to an example case study.

FIG. 3 pictorially illustrates certain operations of the method 200 according to an example case study. More specifically, FIG. 3 shows an annotated image 300 showing a plan view of a residential property 302. The corresponding image (without annotations) is one of the images of the property 302 retrieved by the server 110 from a publicly accessible database of satellite images in the block 202 of the method 200. The annotations shown in the image 300 are generated in the blocks 204 and 206 of the method 200.

According to the images retrieved by the server 110, the property 302 includes a main house 310 with an adjacent driveway 312 accessible from Walnut Avenue. The driveway 312 leads to a garage 314 located in a fenced backyard 320. In the view shown in FIG. 3, to the left of the fenced backyard 320, the property 302 has a fenced-off compound 330. Multiple structures within the compound 330 are identified as structural changes in the block 204 of the method 200. The structural changes include an above-ground swimming pool 332, a trampoline 334, a storage structure 336, a first shed 338, a second shed 340, and a third shed 342. At least the sheds 338, 340, and 342 are identified as unpermitted changes in the block 206. The summed weights of these three unpermitted changes exceed the fixed threshold value used in the block 208 of the method 200, which means that the first anomaly is present. This result triggers checks with respect to potential second and third anomalies in the block 210. The second anomaly check performed in the block 210 reveals that one of the two owners of the property 302 has a criminal record, with indications of a convicted felon and sex offender therein. The third anomaly check performed in the block 210 reveals several complaints from the neighbors in local police logs regarding unrecognized people and/or children at the property 302. Accordingly, a responsive action performed in the block 212 of the method 200 includes triggering a wellness check at the property 302, including a drone flyby and a Public Safety officer visit. The drone flyby may be used to gather additional images of the property, such as images with better resolution and/or images of the structural anomalies taken at various angles for additional 2D-3D analytics and verification.

Figure 4:
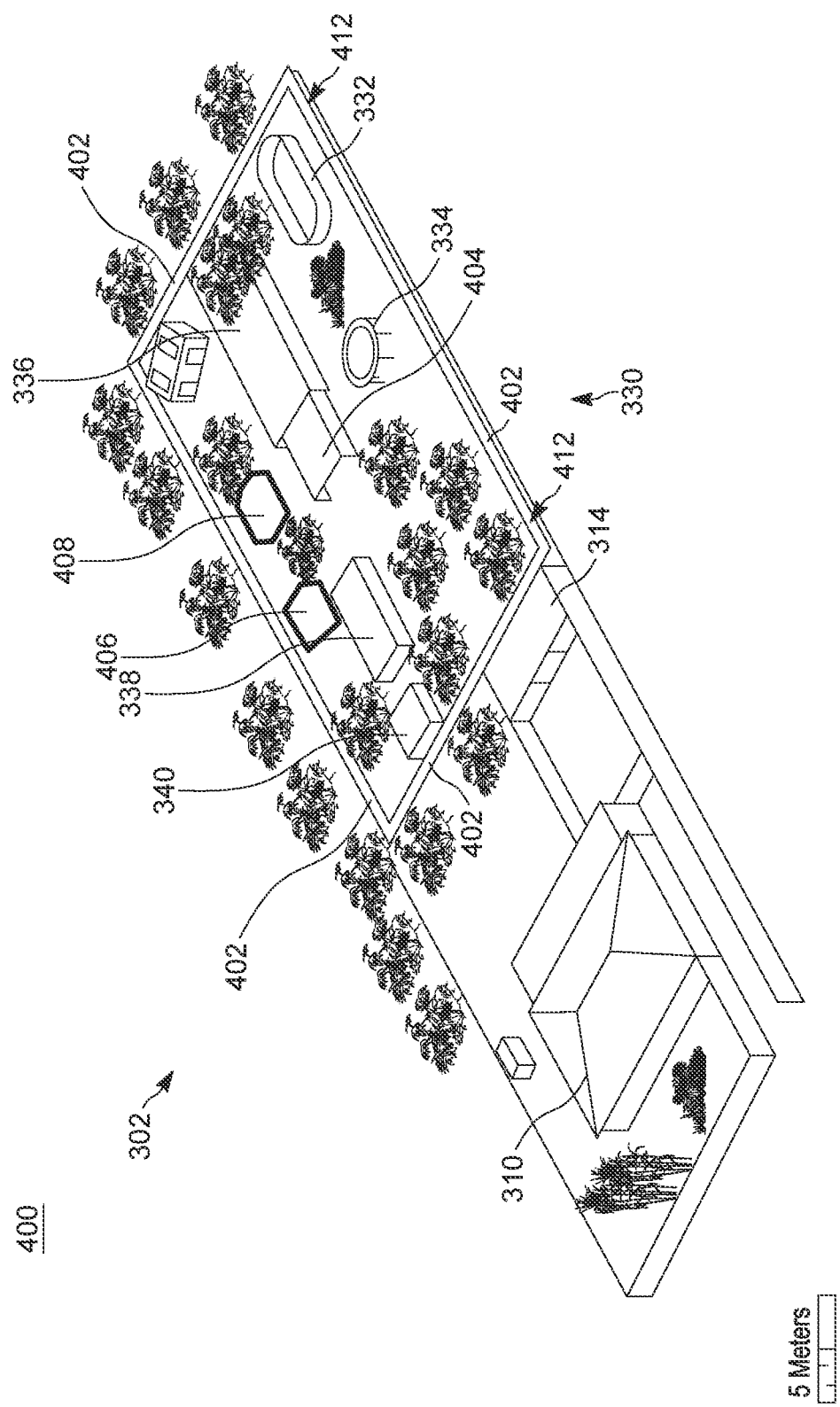
FIG. 4 pictorially illustrates representative results of a wellness check triggered by the method of FIG. 2 according to one example.

FIG. 4 pictorially illustrates features of the property 302 that are readily discoverable during the wellness check triggered in the block 212 of the method 200 according to one example. More specifically, FIG. 4 shows a three-dimensional perspective view 400 of the property 302. The view 400 is qualitatively similar to an aerial view captured by a drone dispatched, in the block 212 of the method 200, for the wellness check at the property 302. The following features of the compound 330 appear readily discoverable by the drone flyby and/or public safety officer visit of the wellness check. The compound 330 is fenced off by a tall fence 402 and is guarded by pitbulls. The fence 402 has tarpaulins 412 hung around it to obscure views from the outside. Parts of the fence 402 are covered by trees and dense vegetation, which further obscures the views. A washroom/shower 404 is located next to the storage structure 336. Additional tarpaulins are arranged to block the view of the washroom/shower 404. Electrical extension cords are arranged to provide electricity to the sheds 338 and 340. The shed 340 is soundproof. Livable tents 406 and 408 are hidden in the shrubs within the compound 330.

The case study illustrated by FIGS. 3-4 represents a real crime of human trafficking that went undiscovered by the authorities for many years. Collectively, the evidence obtained using the method 200 and via the wellness check triggered thereby would have provided sufficient probable cause, with respect to that crime, for a corresponding law-enforcement action. As such, the method 200, if applied to the property 302, would have resulted in a more-timely discovery of the crime and rescue of the victims.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The description and drawings merely illustrate the principles of the disclosure. It will thus be appreciated that those of ordinary skill in the art will be able to devise various arrangements that, although not explicitly described or shown herein, embody the principles of the disclosure and are included within its scope. Furthermore, all examples recited herein are principally intended expressly to be only for pedagogical purposes to aid the reader in understanding the principles of the disclosure and the concepts contributed by the inventor(s) to furthering the art and are to be construed as being without limitation to such specifically recited examples and conditions. Moreover, all statements herein reciting principles, aspects, features, examples, and embodiments of the disclosure are intended to encompass various equivalents thereof. Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The term "coupled" as used herein is defined as connected, although not necessarily directly and not necessarily mechanically. A device or structure that is "configured" in a certain way is configured in at least that way but may also be configured in ways that are not listed.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an example can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Although the elements in the following method claims are recited in a particular sequence with corresponding labeling, unless the claim recitations otherwise imply a particular sequence for implementing some or all of those elements, those elements are not necessarily intended to be limited to being implemented in that particular sequence.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. An automated method of detecting changes in properties, the method comprising:
   receiving, through an interface connected to an electronic processor, a plurality of images of properties including a first image of a property corresponding to a first date and a second image of the property corresponding to a later second date, wherein the property is at least one of a residential property and a commercial property;
   comparing, with the electronic processor, the first image and the second image to detect a structural change to the property;
   accessing, with the electronic processor and through the interface, a property permit database to identify an unpermitted change in the structural change;
   triggering, with the electronic processor, an anomaly check directed at detecting:
      a first anomaly associated with a structure type of the unpermitted change;
      a second anomaly associated with an individual residing on the property; and
      a third anomaly associated with the property based on a public-safety record; and
   in response to at least one of the first, second, and third anomalies having been detected, performing, with the electronic processor, at least one automated responsive action selected from the group consisting of updating a record in a selected database to flag the property as a potential site of unlawful activity by accessing the selected database through the interface, triggering a wellness check at the property using a control message sent through the interface, and generating a recommendation including one or more system-generated prompts for a public-safety officer,
   wherein a selection of the at least one automated responsive action is based on the electronic processor comparing an anomaly score with one or more fixed thresholds; and
   wherein the anomaly score is calculated by the electronic processor by determining and summing respective individual anomaly scores of detected two or more of the first anomaly, the second anomaly, and the third anomaly.

2. The method of claim 1, wherein the first anomaly associated with the structure type of the unpermitted change comprises:
   at least one livable structure; or
   a combination of a livable structure and a structure that prevents egress therefrom.

3. The method of claim 1,
   wherein the respective individual anomaly score of the first anomaly is determined, with the electronic processor, based on a sum of fixed weights assigned to different portions of the unpermitted change, the fixed weights including values selected from the group consisting of:

a weight assigned to a structure that prevents egress;
a weight assigned to a structure that obscures visibility;
a weight assigned to a structure for at least one of excretion and ablution therein;
a weight assigned to a structure for a live-in condition therein;
a weight assigned to a structure for a work-in condition therein; and
wherein the first anomaly includes the sum being larger than a threshold value.

4. The method of claim 1, wherein the second anomaly associated with the individual residing on the property comprises at least one of a criminal record and a civil injunction.

5. The method of claim 4, wherein the criminal record includes at least one indication selected from the group consisting of:
an indication of a convicted felon;
an indication of a sex offender; and
an indication of a parole-officer visit.

6. The method of claim 4, wherein the civil injunction includes at least one indication selected from the group consisting of:
a threat of or an episode of domestic violence;
sexual violence;
dating violence; and
repeat violence.

7. The method of claim 4, wherein indications of the second anomaly are weighted and summed by the electronic processor to determine the respective individual anomaly score of the second anomaly.

8. The method of claim 1, wherein the third anomaly associated with the property based on the public-safety record comprises a record from police complaint logs.

9. The method of claim 8, wherein the respective individual anomaly score of the third anomaly is determined by the electronic processor based on indication in the record of at least one item selected from the group consisting of:
a large number of people coming and going;
a presence of an unrecognized child or unrecognized children at the property; and
a presence of an unrecognized, non-resident person at the property.

10. The method of claim 1, wherein the wellness check includes an automated dispatch of a drone for performing an aerial inspection of the property.

11. The method of claim 10, wherein the aerial inspection is directed to at least one of:
refining images associated with the unpermitted structural change; and
acquiring images of predetermined elements associated with at least one of unlawful living conditions and unlawful working conditions.

12. The method of claim 11, wherein the wellness check further includes an automated dispatch of a public-safety officer having a body worn camera, the automated dispatch being performed in response to the acquired images of the predetermined elements having been confirmed.

13. The method of claim 1, wherein the wellness check includes an automated dispatch of a public-safety officer having a body worn camera (BWC).

14. The method of claim 13, wherein the wellness check further includes providing the public-safety officer at the property with a sequence of computer-generated queries directed at expanding information pertaining to at least one of the first, second, and third anomalies, the queries being based on elements associated with a crime of human trafficking.

15. The method of claim 13, further comprising subjecting a video recording captured at the property through the BWC to video-analytics processing directed at detecting one or more behavioral factors associated with a crime of human trafficking.

16. The method of claim 15, wherein the one or more behavioral factors include at least one factor selected from the group consisting of:
wearing drab clothing;
exhibiting subdued behavior;
avoiding eye contact with the public-safety officer;
a manifestation of a language barrier;
a body language consistent with human trafficking;
an appearance of pale complexion; and
speaking with rehearsed phrases or in a robot-like manner.

17. The method of claim 1, wherein, in response to the first, second, and third anomalies having been detected, generating, with the electronic processor, an automated request for an expedited public-safety action at the property.

18. A non-transitory computer-readable medium storing instructions that, when executed by an electronic processor, cause the electronic processor to perform operations comprising an automated method of detecting changes in properties, the method comprising:
receiving, through an interface connected to the electronic processor, a plurality of images of properties including a first image of a property corresponding to a first date and a second image of the property corresponding to a later second date, wherein the property is at least one of a residential property and a commercial property;
comparing, with the electronic processor, the first image and the second image to detect a structural change to the property;
accessing, with the electronic processor and through the interface, a property permit database to identify an unpermitted change in the structural change;
triggering, with the electronic processor, an anomaly check directed at detecting:
a first anomaly associated with a structure type of the unpermitted change;
a second anomaly associated with an individual residing on the property; and
a third anomaly associated with the property based on a public-safety record; and
in response to at least one of the first, second, and third anomalies having been detected, performing, with the electronic processor, at least one automated responsive action selected from the group consisting of updating a record in a selected database to flag the property as a potential site of unlawful activity by accessing the selected database through the interface, triggering a wellness check at the property using a control message sent through the interface, and generating a recommendation including one or more system-generated prompts for a public-safety officer,
wherein a selection of the at least one automated responsive action is based on the electronic processor comparing an anomaly score with one or more fixed thresholds; and
wherein the anomaly score is calculated by the electronic processor by determining and summing respective individual anomaly scores of detected two or more of the first anomaly, the second anomaly, and the third anomaly.

19. A system for detecting changes in properties, comprising:
an electronic processor; and
memory including program code;
wherein the electronic processor is configured, through execution of the program code to:
receive, through an interface connected to the electronic processor, a plurality of images of properties including a first image of a property corresponding to a first date and a second image of the property corresponding to a later second date, wherein the property is at least one of a residential property and a commercial property;
compare the first image and the second image to detect a structural change to the property;
access, through the interface, a property permit database to identify an unpermitted change in the structural change;
trigger an anomaly check directed at detecting:
a first anomaly associated with a structure type of the unpermitted change;
a second anomaly associated with an individual residing on the property; and
a third anomaly associated with the property based on a public-safety record; and
in response to at least one of the first, second, and third anomalies having been detected, perform at least one automated responsive action selected from the group consisting of updating a record in a selected database to flag the property as a potential site of unlawful activity by accessing the selected database through the interface, triggering a wellness check at the property using a control message sent through the interface, and generating a recommendation including one or more system-generated prompts for a public-safety officer,
wherein a selection of the at least one automated responsive action is based on the electronic processor comparing an anomaly score with one or more fixed thresholds; and
wherein the anomaly score is calculated by the electronic processor by determining and summing respective individual anomaly scores of detected two or more of the first anomaly, the second anomaly, and the third anomaly.

20. An automated method of detecting changes in properties, the method comprising:
receiving, through an interface connected to an electronic processor, a plurality of images of properties including a first image of a property corresponding to a first date and a second image of the property corresponding to a later second date, wherein the property is at least one of a residential property and a commercial property;
comparing, with the electronic processor, the first image and the second image to detect a structural change to the property;
accessing, with the electronic processor and through the interface, a property permit database to identify an unpermitted change in the structural change;
triggering, with the electronic processor, an anomaly check directed at detecting:
a first anomaly associated with a structure type of the unpermitted change;
a second anomaly associated with an individual residing on the property; and
a third anomaly associated with the property based on a public-safety record; and
in response to at least one of the first, second, and third anomalies having been detected, performing, with the electronic processor, at least one automated responsive action selected from the group consisting of updating a record in a selected database to flag the property as a potential site of unlawful activity by accessing the selected database through the interface, triggering a wellness check at the property using a control message sent through the interface, and generating a recommendation including one or more system-generated prompts for a public-safety officer,
wherein the wellness check includes an automated dispatch of a public-safety officer having a body worn camera; and
wherein the wellness check further includes providing the public-safety officer at the property with a sequence of computer-generated queries directed at expanding information pertaining to at least one of the first, second, and third anomalies, the queries being based on elements associated with a crime of human trafficking.

21. An automated method of detecting changes in properties, the method comprising:
receiving, through an interface connected to an electronic processor, a plurality of images of properties including a first image of a property corresponding to a first date and a second image of the property corresponding to a later second date, wherein the property is at least one of a residential property and a commercial property;
comparing, with the electronic processor, the first image and the second image to detect a structural change to the property;
accessing, with the electronic processor and through the interface, a property permit database to identify an unpermitted change in the structural change;
triggering, with the electronic processor, an anomaly check directed at detecting:
a first anomaly associated with a structure type of the unpermitted change;
a second anomaly associated with an individual residing on the property; and
a third anomaly associated with the property based on a public-safety record; and
in response to at least one of the first, second, and third anomalies having been detected, performing, with the electronic processor, at least one automated responsive action selected from the group consisting of updating a record in a selected database to flag the property as a potential site of unlawful activity by accessing the selected database through the interface, triggering a wellness check at the property using a control message sent through the interface, and generating a recommendation including one or more system-generated prompts for a public-safety officer,
wherein the wellness check includes an automated dispatch of a public-safety officer having a body worn camera (BWC); and
wherein the method further comprises subjecting a video recording captured at the property through the BWC to video-analytics processing directed at detecting one or more behavioral factors associated with a crime of human trafficking.

22. The method of claim 21, wherein the one or more behavioral factors include at least one factor selected from the group consisting of:
wearing drab clothing;
exhibiting subdued behavior;
avoiding eye contact with the public-safety officer;

a manifestation of a language barrier;
a body language consistent with human trafficking;
an appearance of pale complexion; and
speaking with rehearsed phrases or in a robot-like manner.

\* \* \* \* \*